US012563275B2

(12) United States Patent
Nihei et al.

(10) Patent No.: US 12,563,275 B2
(45) Date of Patent: Feb. 24, 2026

(54) MEDIA COMPONENT ALIGNMENT AND TRANSFER

(71) Applicant: Disney Enterprises, Inc., Burbank, CA (US)

(72) Inventors: Taryn C. Nihei, New York, NY (US); Giuseppe Manzari, Sunland, CA (US); Monica Alfaro Vendrell, Barcelona (ES); Daniel J. Brooks, Pasadena, CA (US); Luis Ramon Ramirez Rodríguez, Santiago (CL)

(73) Assignee: Disney Enterprises, Inc., Burbank, CA (US)

( * ) Notice: Subject to any disclaimer, the term of this patent is extended or adjusted under 35 U.S.C. 154(b) by 83 days.

(21) Appl. No.: 18/741,358

(22) Filed: Jun. 12, 2024

(65) Prior Publication Data

US 2024/0422408 A1      Dec. 19, 2024

Related U.S. Application Data

(60) Provisional application No. 63/507,886, filed on Jun. 13, 2023.

(51) Int. Cl.
  *H04N 21/8547*      (2011.01)
(52) U.S. Cl.
  CPC .............................. *H04N 21/8547* (2013.01)
(58) Field of Classification Search
  CPC ........... H04N 21/8547; H04N 21/4305; H04N 21/43072; H04N 5/06

USPC ......................................................... 725/116
See application file for complete search history.

(56)                    References Cited

U.S. PATENT DOCUMENTS

| | | | | |
|---|---|---|---|---|
| 11,070,891 | B1 * | 7/2021 | Effinger | H04N 21/43072 |
| 2018/0192086 | A1 * | 7/2018 | Henaire | H04N 21/23424 |
| 2020/0374582 | A1 * | 11/2020 | Zheng | H04N 21/44004 |
| 2021/0204033 | A1 * | 7/2021 | Maurice | G10L 25/57 |
| 2022/0319015 | A1 * | 10/2022 | Aliakseyeu | G06V 20/46 |

* cited by examiner

*Primary Examiner* — Cynthia M Fogg
(74) *Attorney, Agent, or Firm* — Patterson + Sheridan, LLP; Gero G. McClellan

(57)                    ABSTRACT

Techniques for alignment of temporal markers and media content. These techniques include identifying a first plurality of temporal markers for alignment with a first item of media content, and determining, using a computer processor, alignment for the markers and media content. This includes: (i) identifying a plurality of differences between the first plurality of temporal markers and a second plurality of temporal markers, where the second plurality of markers relate to the first item of media content and are alternatively labeled compared with the first plurality of temporal markers, or (ii) determining a cumulative frame-by-frame difference (CD) for each temporal marker of the plurality of temporal markers, the first item of media content, and a second item of media content. The techniques further include performing an alignment action for the first plurality of temporal markers and the first item of media content.

20 Claims, 10 Drawing Sheets

500

START

502
RECEIVE ORIGINAL CONTENT FOR TRANSFER

504
RECEIVE TARGET CONTENT FOR TRANSFER

506
RECEIVE SET OF MARKERS

508
CALCULATE CD CURVE FOR EACH MARKER IN SET

510
ANALYZE CD CURVE FOR EACH MARKER TO RETRIEVE TIMESTAMP

512
TRANSFER MARKERS TO TARGET CONTENT

END

MEDIA COMPONENT ALIGNMENT AND TRANSFER

CROSS-REFERENCE TO RELATED APPLICATIONS

This application claims benefit of U.S. Provisional Patent Application Ser. No. 63/507,886 filed on Jun. 13, 2023. The aforementioned related patent application is herein incorporated by reference in its entirety.

BACKGROUND

A media supply chain frequently manages multiple timed components that are packaged together to create a complete piece of content in streaming and linear platforms. These timed components can include, for example, video components, audio, captions, subtitles, advertisement markers, and any other suitable timed components. Temporally aligning these components enhances the experience of consumers, because many platform features depend upon them. For example, the placement of ads and next up streaming platform functionality depends on well-placed and aligned metadata tags, and misalignment of these features can detract from the viewing experience. As another example, misaligned timed-text components (e.g., subtitles or closed captions) can also make for unpleasant viewing experiences. Aligning these timed components is a challenging and important problem.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

Figure 1:
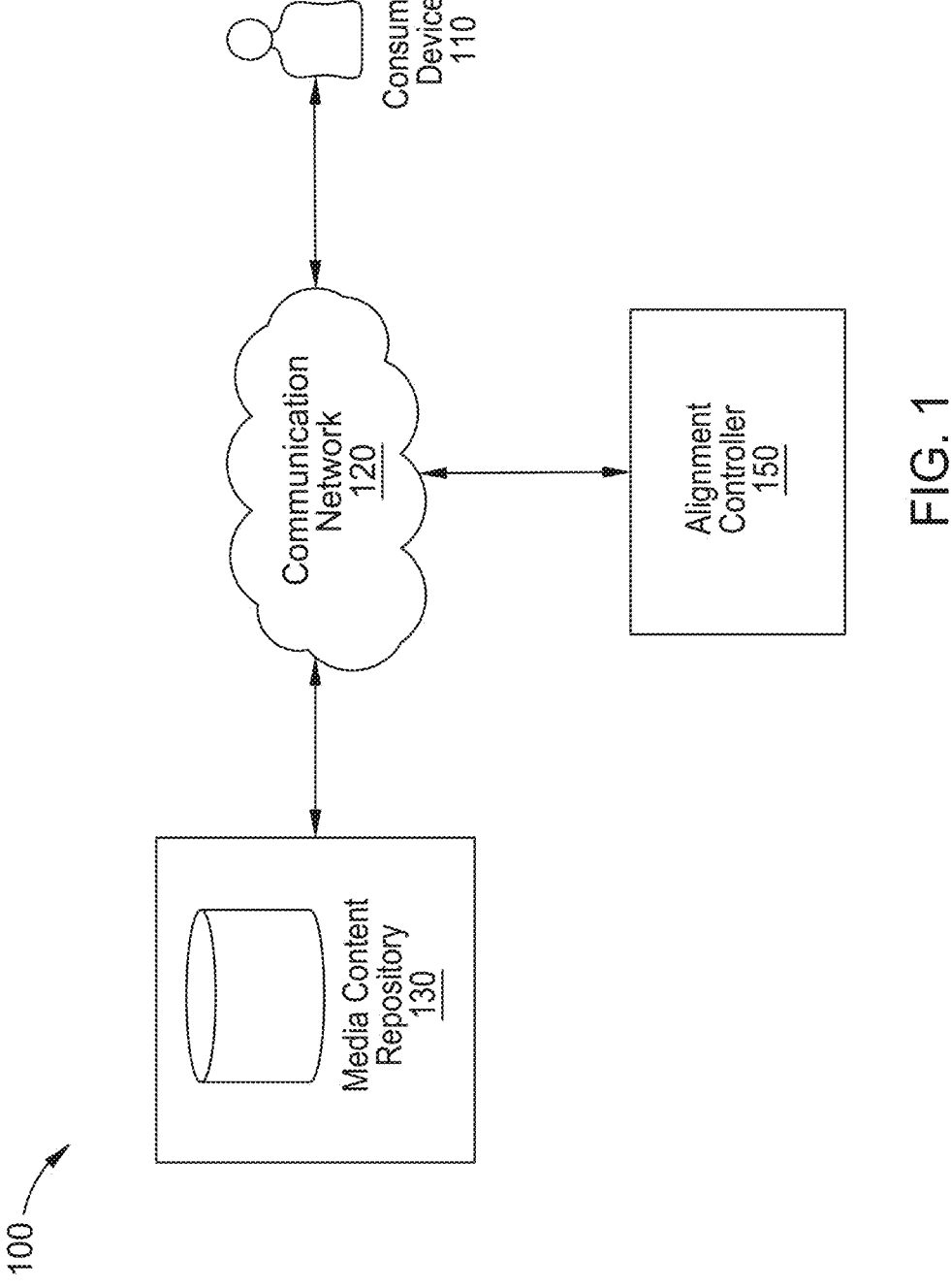
FIG. 1 illustrates a marker alignment system, according to one embodiment.

In an embodiment, various processes in a content supply chain can introduce temporal misalignments in metadata. For example, sequences can be inserted or removed within content, or enhanced through other processes. This can lead to temporal misalignments that negatively impact the consumer experience. In traditional solutions, manual checks (e.g., by human reviewers) identified and handled component misalignment. But this is inefficient and ineffective. As the quantity of content continues to rapidly increase, and deployment becomes faster and faster, manual processes cannot meet the growing need for quality control and validation, including temporal component alignment.

One or more techniques disclosed herein provide an intelligent and automated way to detect, and correct, temporal component misalignments. In an embodiment, this improves quality assurance for a content library and eliminates downstream errors that could create a negative viewing experience for video-on-demand (VOD) and linear television consumers. For example, one or more of these techniques can be used to align chapter markers, and closed captions and subtitles. In an embodiment, chapter markers can be creative-approved markers (e.g., approved by creators, performers, or other people associated with creating the content at issue) that tag turning points in a story. Chapter markers can, for example, be created for physical media (e.g., Digital Versatile Disc (DVD) content or Blu-ray content) and used for a variety of purposes in streaming content (e.g., ad markers or any other suitable purpose). Closed captions and subtitles can be, for example, textual components that play with visual components and track dialogue between characters over the course of the story. Chapter markers and closed captions and subtitles are merely examples, and one or more techniques disclosed herein can be applied to any suitable temporal components.

In an embodiment, a component can be temporally aligned using an alternatively labeled timeline. For example, chapter markers can be cross-referenced with scene metadata markers. The scene metadata markers can be marked automatically (e.g., using a suitable machine learning (ML) technique or another suitable computational algorithm) or by a human. As another example, textual components (e.g., closed captions and subtitles) can be cross-referenced to transcribed dialogue produced by speech-to-text algorithms (e.g., suitable ML techniques or any other speech-to-text techniques). In an embodiment, any suitable ML model can be used, including a neural network (e.g., a deep learning neural network (DNN), convolutional neural network (CNN), or any other suitable neural network), another suitable supervised ML model, or a suitable unsupervised ML model. When temporal alignment differences are detected between the two temporal components (e.g., the component being aligned and the alternatively labeled timeline), a suitable action can be taken. For example, the misalignment can be reported and flagged for human review. As another example, the misalignment can be corrected so that the components become temporally aligned. As another example, the misalignment can be recorded and stored (e.g., along with the correction) for future application to other alignments.

Further, in an embodiment, many pieces of content are presented globally, making localization very important. But producing and managing multiple title versions and their corresponding metadata markers (e.g., advertisement, editorial, character, location, and any other suitable markers) can potentially lead to a level of complexity that is error prone and manually intensive. The process can be simplified by maintaining a single set of metadata markers and transferring or mapping these to target title versions.

One or more techniques described below provide an automated way to align this transfer. This reduces the need to produce (e.g., manually or automatically), and maintain, multiple marker sets for each marker type and title version, reducing manual labor and storage costs, and errors. In an embodiment, these techniques can be applied to many different types of temporal components, as discussed above. For example, a set of markers, original content, and target content can be identified. A cumulative frame-by-frame difference (CD) curve can be calculated and used to align the set of markers from the original content to the target content, so that the markers can be transferred from the original content to the target content while preserving the characteristics of the target content (e.g., the narrative and other suitable characteristics).

One or more techniques disclosed herein have numerous technical advantages. For example, automated alignment as disclosed below (e.g., for correction of misaligned temporal markers or transfer of markers) provides significant improvements in accuracy and user experience, as compared with prior techniques. As another example, one or more techniques disclosed below describe using aggregated marker characteristics (e.g., time series curves as discussed below in relation to FIGS. 3 and 4A-D, and CD curves as discussed below in relation to FIGS. 5-6) for alignment of temporal markers. This is a technical improvement over an approach that analyzes each marker, one-by-one, because it both improves computational efficiency (e.g., reduces the computational resources needed for the marker alignment by using aggregated marker characteristics) and improves accuracy.

FIG. 1 illustrates a marker alignment system 100, according to one embodiment. A consumer wishes to consume (e.g., watch, listen to, or consume in any other suitable manner) an item of media content (e.g., video content, audio content, or any other suitable content) using a consumer device 110. For example, the consumer can use the consumer device 110 to consume an item of media content from a media content repository 130, by streaming the content using a communication network 120. While discussion herein focuses on viewing of video content, for illustration purposes, one or more techniques discussed herein can apply to audio content or any other suitable content. Further, while the discussion herein focuses on streaming content, this is merely an example and the content can be delivered in any suitable manner (e.g., physical media, alternative electronic delivery, or any other suitable manner).

In an embodiment, the consumer device 110 can be any suitable computing device (e.g., a laptop computer, desktop computer, smartphone, tablet computer, smart watch, vehicle, or any other suitable computing device). The communication network 120 can be a local communication network (e.g., a local area network (LAN)), a remote communication network (e.g., a wide area network (WAN)), the Internet, or any other suitable communication network. Further, the consumer device 110 can communicate with the communication network using any suitable wired or wireless technology (e.g., cellular or WiFi technology).

In an embodiment, an alignment controller 150 facilitates alignment of markers (e.g., for media content maintained in the media content repository 130). For example, the alignment controller 150 can facilitate automated alignment of temporal components in media content. This is discussed further, below, with regard to FIG. 3. Further, the alignment controller 150 can facilitate transfer and alignment of markers for localization. This is discussed further, below, with regard to FIG. 5.

While the media content repository 130, alignment controller 150, and consumer device 110 are each illustrated as a single entity, in an embodiment, the various components can be implemented using any suitable combination of physical compute systems, cloud compute nodes and storage locations, or any other suitable implementation. For example, the media content repository 130, alignment controller 150, or both, could be implemented using a server or cluster of servers. As another example, the media content repository 130, alignment controller 150, or both, can be implemented using a combination of compute nodes and storage locations in a suitable cloud environment. For example, one or more of the components of the media content repository 130, alignment controller 150, or both, can be implemented using a public cloud, a private cloud, a hybrid cloud, or any other suitable implementation.

Figure 2:
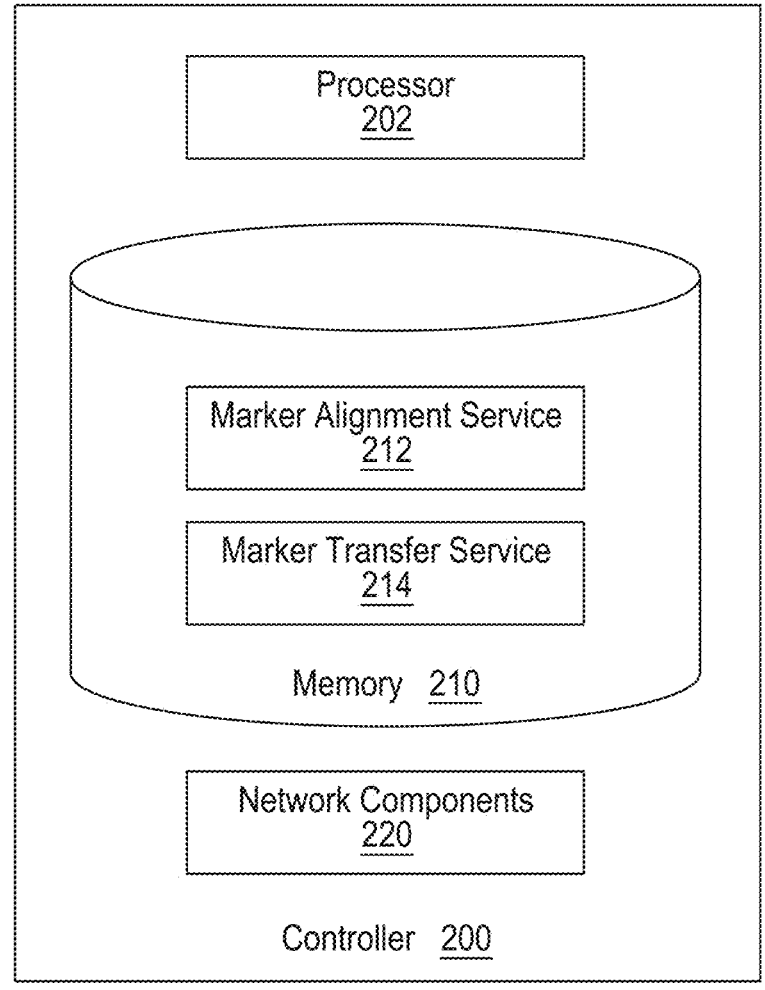
FIG. 2 is a block diagram illustrating a controller, according to one embodiment.

FIG. 2 is a block diagram illustrating a controller 200, according to at least one embodiment. In an embodiment, the controller 200 corresponds with the alignment controller 150 illustrated in FIG. 1. The controller 200 includes a processor 202, a memory 210, and network components 220. The processor 202 generally retrieves and executes programming instructions stored in the memory 210. The processor 202 is included to be representative of a single central processing unit (CPU), multiple CPUs, a single CPU having multiple processing cores, graphics processing units (GPUs) having multiple execution paths, and the like.

The network components 220 include the components necessary for the controller 200 to interface with components over a network (e.g., as illustrated in FIG. 1). For example, the controller 200 can use the network components 220 to interface with remote storage and compute nodes using a communication network (e.g., the communication network 120 illustrated in FIG. 1).

The controller 200 can interface with other elements in the system over a LAN, for example an enterprise network, a WAN, the Internet, or any other suitable network. The network components 220 can include wired, WiFi or cellular network interface components and associated software to facilitate communication between the controller 200 and a communication network (e.g., the communication network 120 illustrated in FIG. 1).

Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory. The memory 210 generally includes program code for performing various functions related to use of the controller 200. The program code is generally described as various functional "applications" or "services" within the memory 210, although alternate implementations may have different functions and/or combinations of functions. Within the memory 210, a marker alignment service 212 facilitates aligning temporal markers for media content. This is discussed further, below, with regard to FIG. 3. A marker transfer service 214 facilitates transfer and alignment of markers for media content (e.g., for localization). This is discussed further, below, with regard to FIG. 5.

Although FIG. 2 depicts the marker alignment service 212 and the marker transfer service 214 as located in the memory 210, that representation is merely provided as an illustration for clarity. More generally, the alignment controller may include one or more computing platforms, such as computer servers for example, which may be co-located, separated, or may form an interactively linked but distributed system, such as a cloud-based system (e.g., a public cloud, a private cloud, a hybrid cloud, or any other suitable cloud-based system). As a result, the processor 202 and memory 210 may correspond to distributed processor and memory resources within a computing environment. Further, in an embodiment the marker alignment service 212 and marker transfer service 214 may be separated, and divided across any suitable number of computing systems or compute nodes (e.g., in a cloud computing system).

Figure 3:
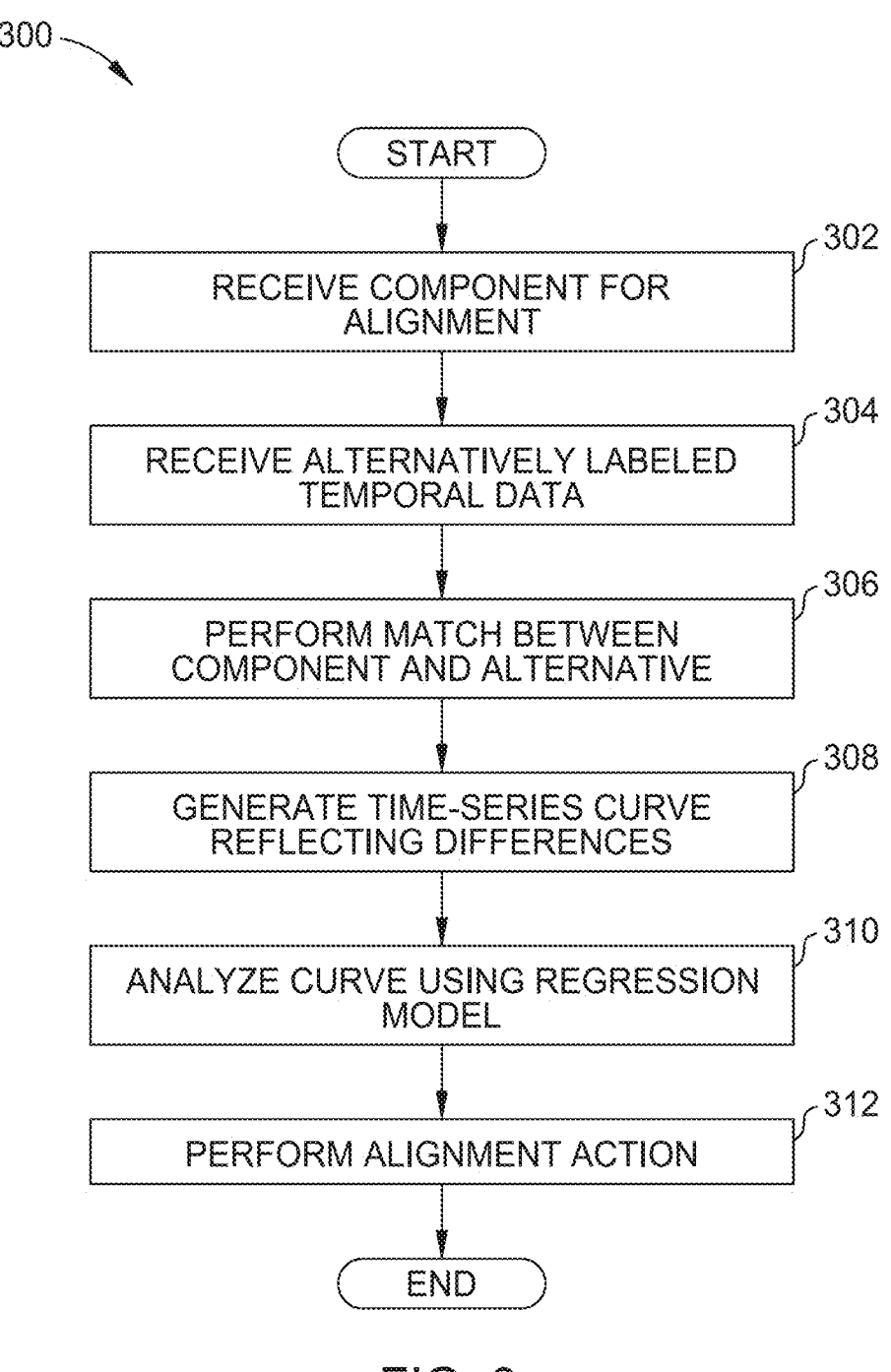
FIG. 3 is a flowchart illustrating marker alignment, according to one embodiment.

FIG. 3 is a flowchart 300 illustrating marker alignment, according to one embodiment. At block 302 a marker alignment service (e.g., the marker alignment service 212 illustrated in FIG. 2) receives a component for alignment. In an embodiment, as discussed above, the component for alignment can include one or more timed components for alignment (e.g., video components, audio, captions, subtitles, advertisement markers, and any other suitable timed components).

At block 304, the marker alignment service receives alternatively labeled temporal data. In an embodiment, alternatively labeled temporal data is used to compare with the data being aligned. The alternatively labeled temporal data can come from any suitable source. For example, alternatively labeled chapter markers may be generated using scene metadata markers. The scene metadata markers can be marked automatically (e.g., using a suitable machine learning (ML) technique or another suitable computational algorithm) or by a human. As another example, alternatively labeled temporal markers can be textual markers generated based on transcribed dialogue produced by speech-to-text algorithms (e.g., suitable ML techniques or any other speech-to-text techniques). These are merely examples, and any suitable alternatively labeled temporal data can be used from any suitable source.

At block 306, the marker alignment service performs a match between the component for alignment and the alternatively labeled temporal data. In an embodiment, the marker alignment service performs a nearest neighbor match between these label sets and their associated timestamps. This is merely an example, and any suitable technique can be used.

At block 308, the marker alignment service generates a time-series curve reflecting differences between data sets. In an embodiment, the residuals between timestamps of the two data sets (e.g., the component for alignment received at block 302 and the alternatively labeled temporal data received at block 304) are computed. This creates a time-series representing the measured differences between matched timestamps. These curves exhibit characteristic shapes and forms that correspond to different types of possible temporal misalignments. FIGS. 4A-D, below, illustrate example curves.

At block 310, the marker alignment service analyzes the curve using a regression model. In an embodiment, the media alignment uses a regression model, or any other suitable technique, to characterize the residual curve to generate several statistics. These can include offset, a fixed difference between metadata (e.g., the content being aligned) and ground truth (e.g., the alternatively labeled temporal data). In an embodiment, offset is associated with additional frames added at start of content (e.g., as discussed below in relation to FIG. 4A).

The statistics can further include drift, a linearly growing difference between metadata and ground truth. This can be associated with incorrect timecode processing. The statistics can further include goodness of fit, which indicates a quality of regression fit (e.g., reliability of marker alignment service recommendations). The statistics can further include a fraction of matched markers. In an embodiment, a low number of matched metadata and ground truth markers indicates a completely different content version, making automatic alignment extremely difficult or impossible, and suggesting that human review is needed.

At block 312, the marker alignment service performs an alignment action. In an embodiment, the marker alignment service takes any one or more suitable alignment actions. For example, the marker alignment service can report the misalignment and notify a human to flag it for human review (e.g., review by a human administrator). As another example, the marker alignment service can temporally align the components (e.g., using the alternatively labeled temporal data received at block 304). For example, the marker alignment service can recognize that the misalignment adheres to a known pattern (e.g., as illustrated below in relation to FIGS. 4A-C), and can correct the misalignment based on that recognized pattern.

As a further example, the marker alignment service can record the misalignment, compute the translation to correct it, and store it for future translation processes. This allows the correction to be used for future alignments. In an embodiment, the marker alignment service performs any combination of these actions. Further, these are merely examples, and the marker alignment service can perform any suitable action.

FIGS. 4A-D illustrate time series curves reflecting differences between a component for alignment and alternatively labeled temporal data, according to one embodiment. In an embodiment, FIGS. 4A-D illustrate example curves generated at block 308 illustrated in FIG. 3, above.

Figure 4A:
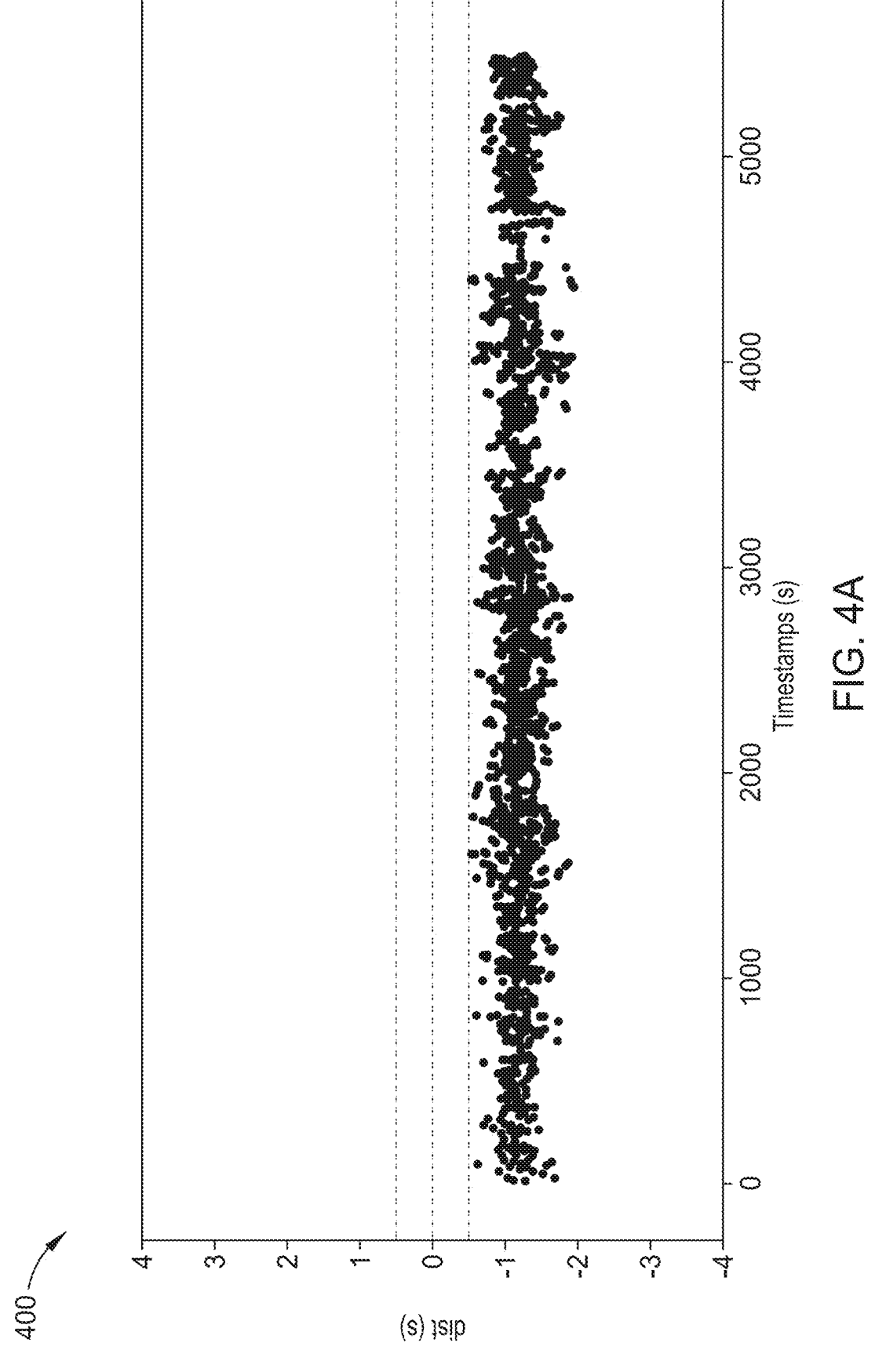
FIGS. 4A-D illustrate time series curves reflecting differences between a component for alignment and alternatively labeled temporal data, according to one embodiment.

FIG. 4A illustrates a curve 400. The curve 400 illustrates, for example, a plot of residuals between closed captions components and transcribed dialogue. As illustrated, the x-axis illustrates a timestamp label and the y-axis illustrates a distance between data sets (e.g., a residual between corresponding timestamps of the two data sets). In an embodiment, the flat curve 400 reflects a consistent differential between components, and is characteristic of an offset created by an inserted sequence of frames. For example, additional frames may be inserted at the start of the content, in either (or both) of the data sets. This consistent differential could be corrected by, for example, correcting the alignment to account for the inserted sequence of frames.

Figure 4B:
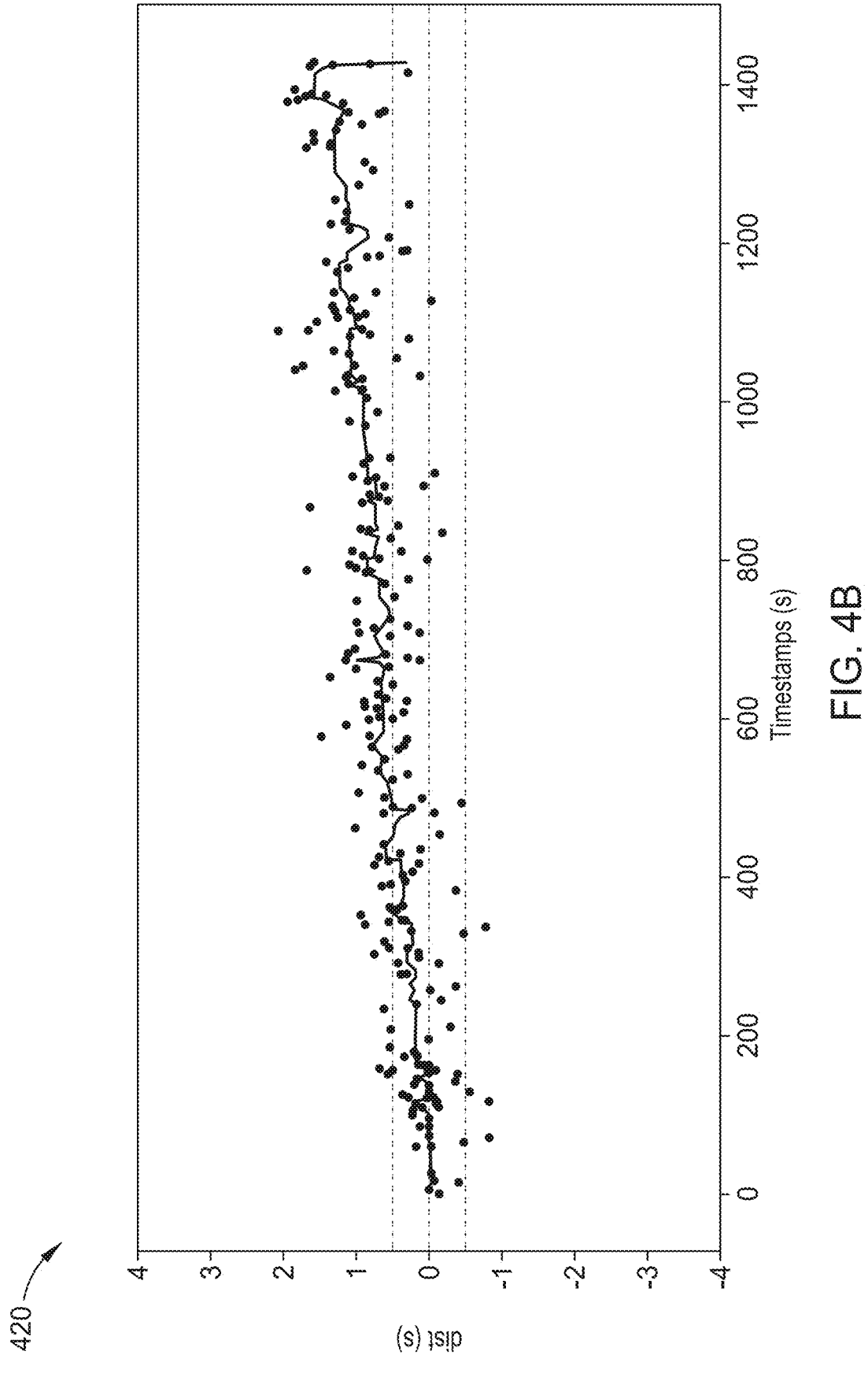

FIG. 4B illustrates a curve 420. The curve 420 illustrates, for example, another example of a plot of residuals between closed captions components and transcribed dialogue. As in FIG. 4A, the x-axis illustrates a timestamp label and the y-axis illustrates a distance between data sets (e.g., a residual between corresponding timestamps of the two data sets). In an embodiment, the upward slope of this time-series curve 420 is indicative of errors relating to frame rates (e.g., mishandled frame rates). For example, an error in frame rate can result in residuals between markers increasing over time (e.g., the difference between the component being aligned and the alternatively labeled data increases over time). This could be corrected by, for example, correcting the frame rate errors, modifying the temporal components to account for the frame rate errors, or both. This is merely an example.

Figure 4C:
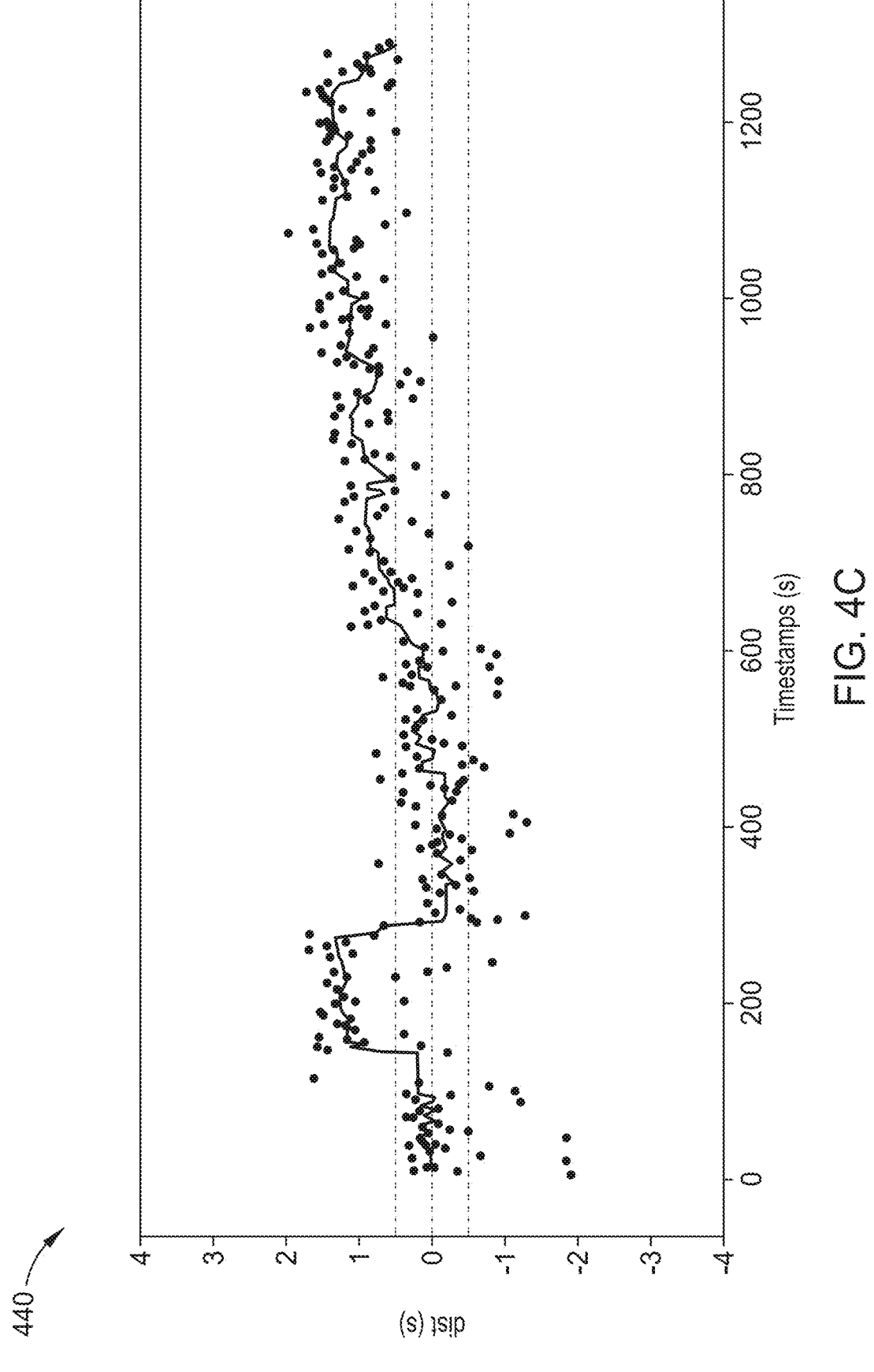

FIG. 4C illustrates a curve 440. The curve 440 illustrates, for example, another example of a plot of residuals between closed captions components and transcribed dialogue. As in FIG. 4A, the x-axis illustrates a timestamp label and the y-axis illustrates a distance between data sets (e.g., a residual between corresponding timestamps of the two data sets). In an embodiment, the shape of this time-series curve 440 is indicative of a combination of both an inserted sequence and a mismatch in frame rates between the component and alternative label set (e.g., a combination of the errors illustrated in FIGS. 4A and 4B). This could be corrected by, for example, both correcting the alignment to account for the inserted sequence of frames and correcting the frame rate errors or modifying the temporal components to account for the frame rate errors, as discussed above in relation to FIGS. 4A-B.

Figure 4D:
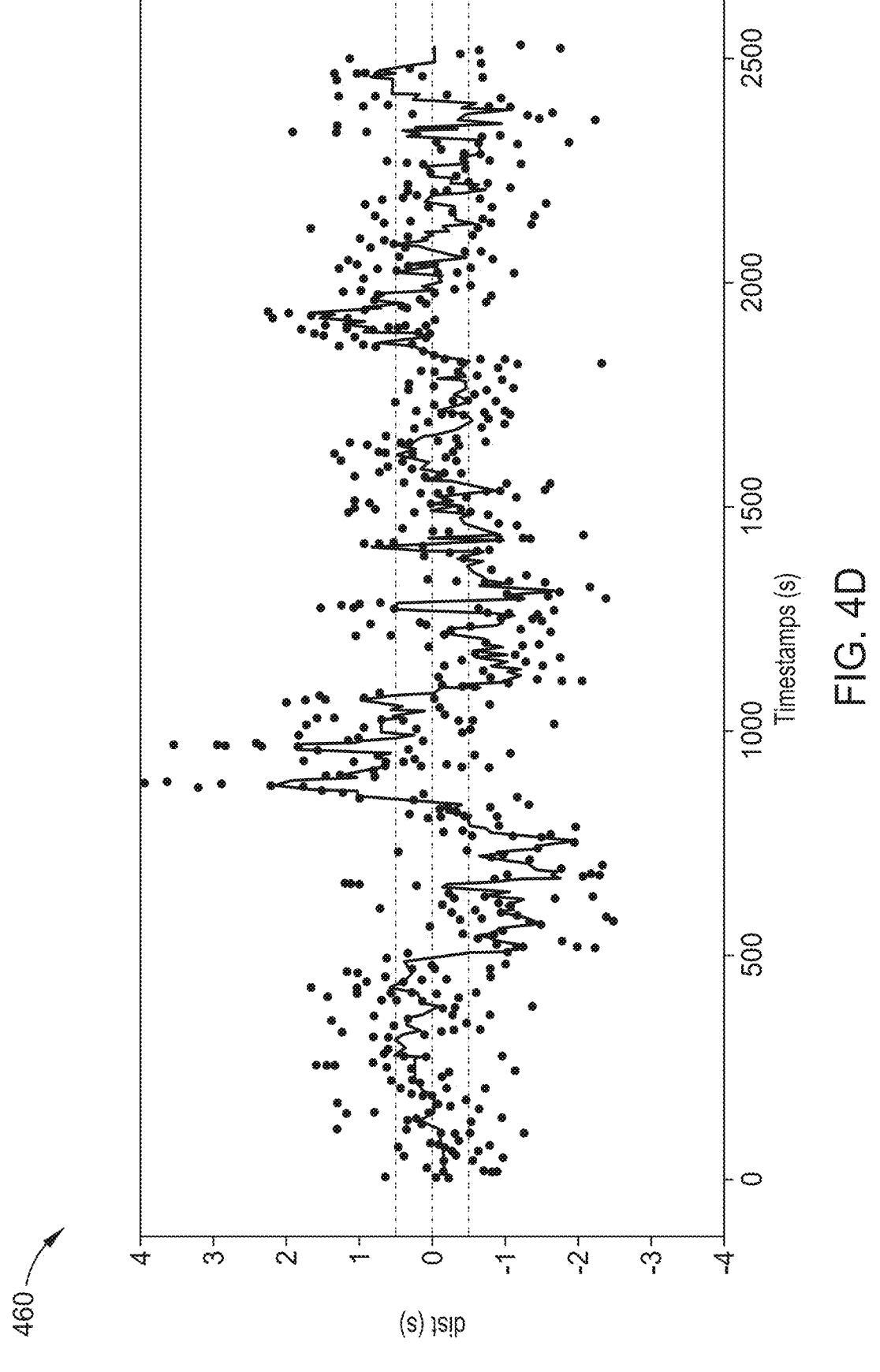

FIG. 4D illustrates a curve 460. The curve 460 illustrates, for example, another example of a plot of residuals between closed captions components and transcribed dialogue. As in FIG. 4A, the x-axis illustrates a timestamp label and the y-axis illustrates a distance between data sets (e.g., a residual between corresponding timestamps of the two data sets). The curve 460 illustrates a wide variance in the closed captions alignment without a consistent pattern. Automatic correction of this variance would be difficult, and so the marker alignment service could flag this for human review. This is merely an example, and the marker alignment service could perform any suitable alignment action (e.g., as discussed above in relation to block 312 illustrated in FIG. 3).

Figure 5:
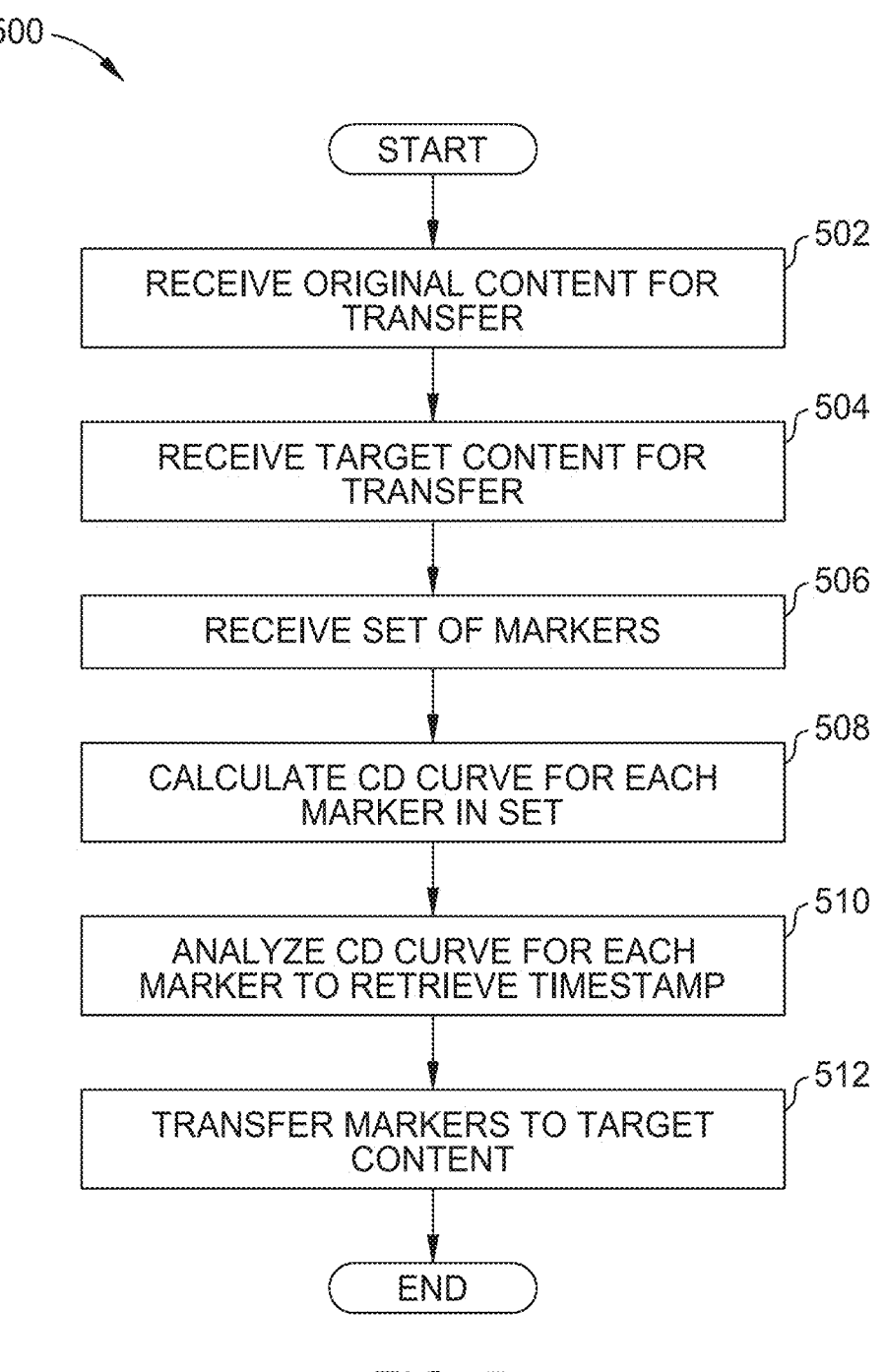
FIG. 5 is a flowchart illustrating transfer of temporal markers, according to one embodiment.

FIG. 5 is a flowchart 500 illustrating transfer of temporal markers, according to one embodiment. As discussed above, in an embodiment transfer and alignment of temporal markers (e.g., for localization) is a challenging problem. In an embodiment, a marker transfer service (e.g., the marker transfer service 214 illustrated in FIG. 2) accepts as input an original version content item (e.g., a source video), corresponding metadata markers, and a target version content item (e.g., a target video). The marker transfer service returns a set of markers transferred to the target content item that align to the target content, preserving the placement of markers relative to the content storyline in the original content item.

At block 502 the marker transfer service receives original content for transfer. At block 504, the marker transfer service receives the target content for transfer. At block 506, the marker transfer service receives the set of markers (e.g., a quality-control (QC) assured set of markers for the original content). In an embodiment, the original and target content can be video content, audio content, or any other suitable content. The markers can be any suitable metadata markers (e.g., advertisement markers, editorial markers, character markers, location markers, or any other suitable markers as discussed above in relation to block 302 illustrated in FIG. 3).

At block 508, the marker transfer service calculates a CD curve for each marker in the set. In an embodiment, the marker transfer service samples, from the original content, windowed segments (e.g., segments of video frames) about each marker within the original marker set. The marker transfer service compares each windowed segment to a sliding window segment in the target content (e.g., a sliding window of frames in a target video). The marker transfer service computes the CD for each sliding window segment in the target video. The cumulative frame-by-frame difference CD can be defined using the equation below:

$$CD = \frac{1}{L(T-L)} \sum_{j=1}^{T-L} \sum_{i=1}^{L} HD(OVF_i, TVF_{j+i})$$

In this equation, $HD(Image_1, Image_2)$ is the average Hamming distance (e.g., the bit-wise difference between two binary strings) between frames (e.g., between a p-hash encoding of two image frames), with a $1/(L*(T-L))$ normalization term, where T and L are window sizes and $OVF_i$ and $TVF_{j+i}$ are the ith and (j+i)th frames of the original and target video. In an embodiment, using the average hamming distance with the $1/(L*(T-L))$ normalization term enables a consistent description of similarity if the window sizes T and L are changed. This produces a CD curve with a value at each frame in the target video. A video match is found in the target video when this curve exhibits a minimum below a given threshold. While this example focuses on a CD for video content, these techniques can be applied for suitable audio content (e.g., identifying cumulative differences for audio samples) or any other suitable content. This is illustrated further, below, with regard to FIG. 6.

At block 510, the marker transfer service analyzes the CD curve for each marker to retrieve a timestamp. As discussed above, in an embodiment the marker transfer service identifies a video match in the target video when the respective CD curve exhibits a minimum below a given threshold. The marker transfer service can analyze each respective CD curve, for each respective marker in the set of markers, to retrieve the appropriate transfer timestamp for the relevant marker.

At block 512 the marker transfer service transfers the markers to the target content. In an embodiment, the marker transfer service uses the transfer timestamp identified at block 510 to align the marker with the target content, and transfers the markers for the target content. For example, the marker transfer service can modify (or re-create) the markers so that they are aligned to the target content, preserving the placement of markers relative to the content storyline in the original content item. The transfer timestamps can identify the point at which the respective markers should be aligned in the target content.

Figure 6:
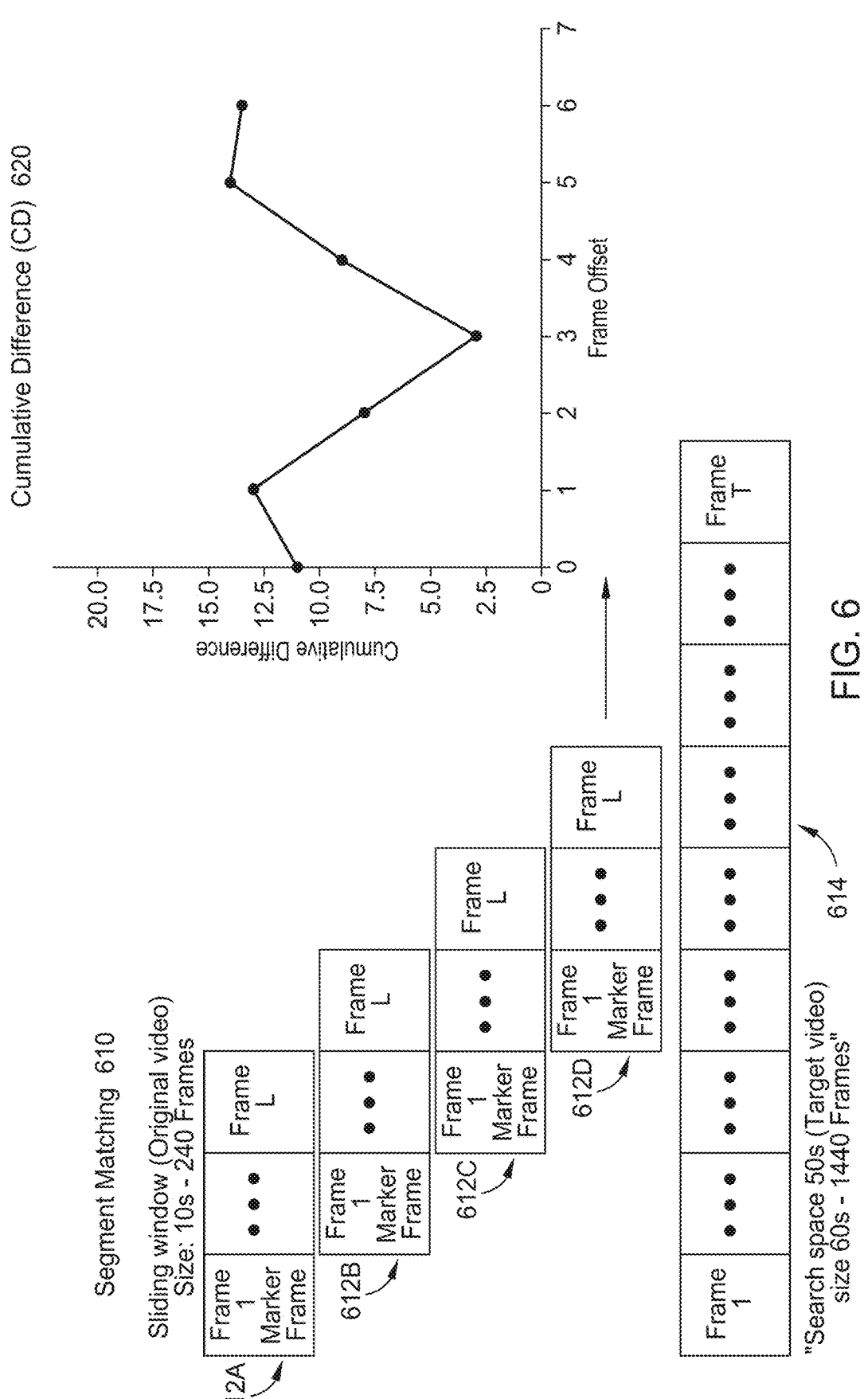
FIG. 6 illustrates calculating a cumulative frame-by-frame difference (CD) curve for original and content items, according to one embodiment.

FIG. 6 illustrates calculating a CD curve for original and content items, according to one embodiment. As discussed above in relation to block 508 illustrated in FIG. 5, in an embodiment a marker transfer service (e.g., the marker transfer service 214 illustrated in FIG. 2) samples, from the original content, windowed segments (e.g., segments of video frames) about each marker within the original marker set. The marker transfer service compares each windowed segment to a sliding window segment in the target content (e.g., a sliding window of frames in a target video). The marker transfer service computes the CD for each sliding window segment in the target video.

A FIG. 610 illustrates segment matching, using a sliding window, for example video content. The marker transfer service identifies a series of sliding window segments 612A-N between a windowed segment of the original content video and a sliding window of the target content video. These sliding window segments 612A-N are used to generate matched segments within a search space 614 (e.g., a segment of a target content video), and to generate a CD curve 620. The x-axis of the CD curve 620 represents a frame offset, and the y-axis of the CD curve 620 represents a cumulative difference. In an embodiment, the marker transfer service finds a match (e.g., between an original video content and a target video content) where the CD curve falls below a certain threshold. In an embodiment, the threshold can be determined prior to operation, or dynamically during operation, and can be set using any suitable technique (e.g., by a human administrator, using a suitable rules-based or algorithmic technique, using a suitable machine learning (ML) model, or using any other suitable technique.

Figure 7:
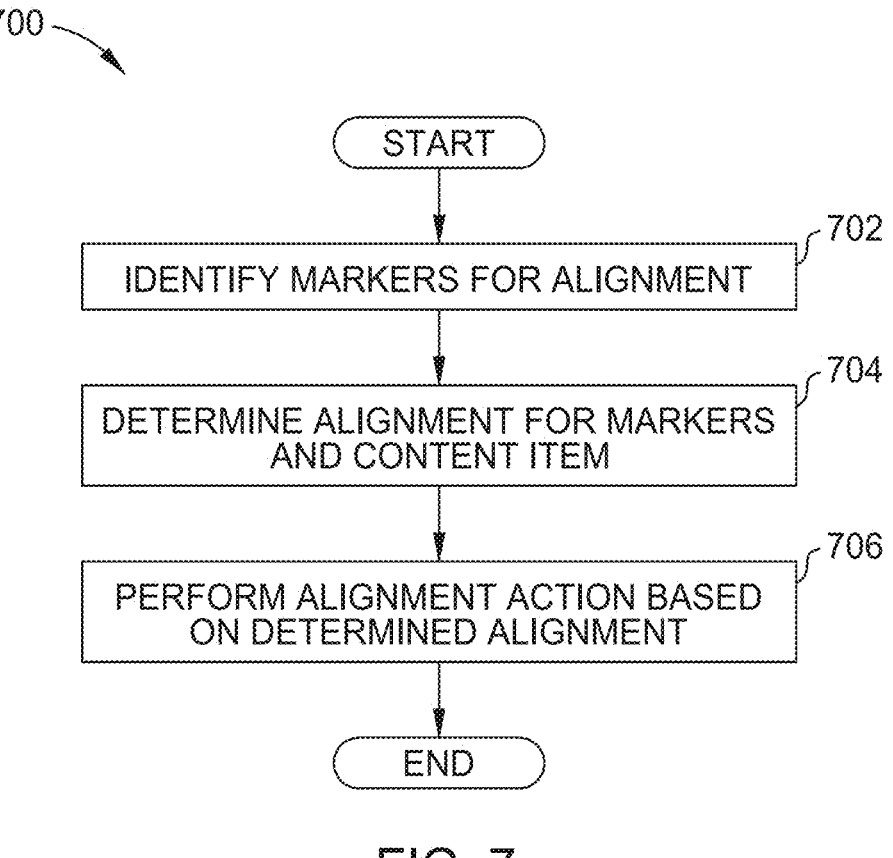
FIG. 7 is a flowchart illustrating aligning temporal markers for a content item, according to one embodiment.

FIG. 7 is a flowchart 700 illustrating aligning temporal markers for a content item, according to one embodiment. In an embodiment FIG. 7 corresponds with aligning temporal markers to correct temporal component misalignments (e.g., as discussed above in relation to FIGS. 3 and 4A-D) and aligning temporal markers to transfer markers between an original and target content item (e.g., as discussed above in relation to FIGS. 5-6). At block 702 an alignment service (e.g., the marker alignment service 212 illustrated in FIG. 2, the marker transfer service 214 illustrated in FIG. 2, or any other suitable software service or combination of software services) identifies markers for alignment. For example, the alignment service can identify one or more timed components for alignment (e.g., video components, audio, captions, subtitles, advertisement markers, and any other suitable timed components), as discussed above in relation to block 302 illustrated in FIG. 3 or block 506 illustrated in FIG. 5.

At block 704, the alignment service determines alignment for the markers and a content item. In an embodiment, as discussed above in relation to FIG. 3, the alignment service can correct alignment errors in a content item by using alternatively labeled temporal data to align the temporal markers with a content item. For example, the alignment service can identify differences between the temporal markers and the alternatively labeled temporal data (e.g., using a time-series curve and regression model, as discussed above in relation to FIGS. 3 and 4A-D). Alternatively, or in addition, the alignment service can align markers for transfer between content items by determining a CD curve for each temporal marker and an original and target content item (e.g., as discussed above in relation to FIGS. 5-6).

At block 706, the alignment service performs an alignment action based on the alignment determined at block 704. In an embodiment, the alignment service can take an alignment action to correct misalignment, as discussed above in relation to block 312 illustrated in FIG. 3. Alternatively, or in addition, the alignment service can transfer markers to target content, as discussed above in relation to block 512 illustrated in FIG. 5.

ADDITIONAL CONSIDERATIONS

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method, comprising:

identifying a first plurality of temporal markers for alignment with a first item of media content;

determining, using a computer processor, alignment for the first plurality of temporal markers and the first item of media content, comprising at least one of:

(i) identifying a plurality of differences between the first plurality of temporal markers and a second plurality of temporal markers, wherein the second plurality of markers relate to the first item of media content and are alternatively labeled compared with the first plurality of temporal markers, or (ii) determining a cumulative frame-by-frame difference (CD) for each temporal marker of the plurality of temporal markers, the first item of media content, and a second item of media content; and performing, based on the determined alignment for the first plurality of temporal markers, an alignment action for the first plurality of temporal markers and the first item of media content.

2. The method of claim 1, wherein determining alignment for the first plurality of temporal markers comprises identifying the plurality of differences between the first plurality of temporal markers and a second plurality of temporal markers.

3. The method of claim 2, wherein identifying the plurality of differences between the first plurality of temporal markers and the second plurality of temporal markers comprises:

generating a time series curve reflecting the differences between the first plurality of temporal markers and the second plurality of temporal markers.

4. The method of claim 3, wherein performing, based on the determined alignment for the first plurality of temporal markers, the alignment action for the first plurality of temporal markers and the first item of media content comprises:

determining the alignment action based on analyzing the time series curve using a regression model.

5. The method of claim 4, wherein determining the alignment action based on analyzing the time series curve using a regression model comprises:

recognizing one or more characteristics of the time series curve using the regression model; and improving alignment of the first plurality of temporal markers and the first item of media content by modifying, using a computer processor, the first plurality of temporal markers based on the recognized one or more characteristics.

6. The method of claim 4, wherein determining the alignment action based on analyzing the time series curve using a regression model comprises:

determining, based on the regression model, to notify a human without modifying the first plurality of temporal markers.

7. The method of claim 2, wherein the second plurality of temporal markers are generated based on at least one of: (i) scene marker data generated automatically using a computer processor, (ii) scene marker data generated using human review, or (iii) transcribed dialog produced using automated speech-to-text.

8. The method of claim 7, wherein the second plurality of temporal markers are generated using a machine learning (ML) model.

9. The method of claim 1, wherein determining alignment for the first plurality of temporal markers comprises determining the CD for each temporal marker of the plurality of temporal markers, the first item of media content, and a second item of media content.

10. The method of claim 9, wherein determining the CD for each temporal marker of the plurality of temporal markers comprises generating a CD curve for each temporal marker of the plurality of temporal markers, and wherein performing, based on the determined alignment for the first plurality of temporal markers, the alignment action for the first plurality of temporal markers and the first item of media content comprises transferring the plurality of temporal markers between the first item of media content and the second item of media content by identifying a plurality of timestamps, corresponding to the plurality of temporal markers, based on the generated CD curve.

11. A non-transitory computer program product comprising:

one or more non-transitory computer readable media containing, in any combination, computer program code that, when executed by operation of any combination of one or more processors, performs operations comprising:

identifying a first plurality of temporal markers for alignment with a first item of media content;

determining alignment for the first plurality of temporal markers and the first item of media content, comprising at least one of:

(i) identifying a plurality of differences between the first plurality of temporal markers and a second plurality of temporal markers, wherein the second plurality of markers relate to the first item of media content and are alternatively labeled compared with the first plurality of temporal markers, or (ii) determining a cumulative frame-by-frame difference (CD) for each temporal marker of the plurality of temporal markers, the first item of media content, and a second item of media content; and performing, based on the determined alignment for the first plurality of temporal markers, an alignment action for the first plurality of temporal markers and the first item of media content.

12. The non-transitory computer program product of claim 11, wherein determining alignment for the first plurality of temporal markers comprises identifying the plurality of differences between the first plurality of temporal markers and a second plurality of temporal markers.

13. The non-transitory computer program product of claim 12, wherein identifying the plurality of differences between the first plurality of temporal markers and the second plurality of temporal markers comprises:

generating a time series curve reflecting the differences between the first plurality of temporal markers and the second plurality of temporal markers.

14. The non-transitory computer program product of claim 13, wherein performing, based on the determined alignment for the first plurality of temporal markers, the alignment action for the first plurality of temporal markers and the first item of media content comprises:

determining the alignment action based on analyzing the time series curve using a regression model, comprising:

recognizing one or more characteristics of the time series curve using the regression model; and improving alignment of the first plurality of temporal markers and the first item of media content by modifying the first plurality of temporal markers based on the recognized one or more characteristics.

15. The non-transitory computer program product of claim 11, wherein determining alignment for the first plurality of temporal markers comprises determining the CD for each temporal marker of the plurality of temporal markers, the first item of media content, and a second item of media content, wherein determining the CD for each temporal marker of the plurality of temporal markers comprises generating a CD curve for each temporal marker of the plurality of temporal markers, and wherein performing, based on the determined alignment for the first plurality of temporal markers, the alignment action for the first plurality of temporal markers and the first item of media content comprises transferring the plurality of temporal markers between the first item of media content and the second item of media content by identifying a plurality of timestamps, corresponding to the plurality of temporal markers, based on the generated CD curve.

16. A system, comprising:

one or more processors; and one or more memories storing a program, which, when executed on any combination of the one or more processors, performs operations, the operations comprising:

identifying a first plurality of temporal markers for alignment with a first item of media content;

determining alignment for the first plurality of temporal markers and the first item of media content, comprising at least one of:

(i) identifying a plurality of differences between the first plurality of temporal markers and a second plurality of temporal markers, wherein the second plurality of markers relate to the first item of media content and are alternatively labeled compared with the first plurality of temporal markers, or (ii) determining a cumulative frame-by-frame difference (CD) for each temporal marker of the plurality of temporal markers, the first item of media content, and a second item of media content; and performing, based on the determined alignment for the first plurality of temporal markers, an alignment action for the first plurality of temporal markers and the first item of media content.

17. The system of claim 16, wherein determining alignment for the first plurality of temporal markers comprises identifying the plurality of differences between the first plurality of temporal markers and a second plurality of temporal markers.

18. The system of claim 17, wherein identifying the plurality of differences between the first plurality of temporal markers and the second plurality of temporal markers comprises:

generating a time series curve reflecting the differences between the first plurality of temporal markers and the second plurality of temporal markers.

19. The system of claim 18, wherein performing, based on the determined alignment for the first plurality of temporal markers, the alignment action for the first plurality of temporal markers and the first item of media content comprises:

determining the alignment action based on analyzing the time series curve using a regression model, comprising:

recognizing one or more characteristics of the time series curve using the regression model; and improving alignment of the first plurality of temporal markers and the first item of media content by modifying the first plurality of temporal markers based on the recognized one or more characteristics.

20. The system of claim 16, wherein determining alignment for the first plurality of temporal markers comprises determining the CD for each temporal marker of the plurality of temporal markers, the first item of media content, and a second item of media content, wherein determining the CD for each temporal marker of the plurality of temporal markers comprises generating a CD curve for each temporal marker of the plurality of temporal markers, and wherein performing, based on the determined alignment for the first plurality of temporal markers, the alignment action for the first plurality of temporal markers and the first item of media content comprises transferring the plurality of temporal markers between the first item of media content and the second item of media content by identifying a plurality of timestamps, corresponding to the plurality of temporal markers, based on the generated CD curve.

* * * * *